Jan. 25, 1955   B. L. HAVENS   2,700,738
DELAY-LINE END CELL
Filed May 5, 1951

INVENTOR
BYRON L. HAVENS
BY Albert R. Hodges
ATTORNEY

2,700,738

DELAY-LINE END CELL

Byron L. Havens, Closter, N. J., assignor to International Business Machines Corporation, New York, N. Y., a corporation of New York Application May 5, 1951, Serial No. 224,794

8 Claims. (Cl. 310—8.3)

This invention relates to end cells for ultrasonic delay lines, and more particularly to end cells for delay lines of the type employing a liquid, such as mercury, as the transmitting medium.

Delay lines of the type herein contemplated generally comprise a relatively long tube to each end of which is fitted an end cell comprising a transducer element. The tube is filled with a liquid having a suitable vibration-transmitting characteristic, and this liquid makes contact with the transducer element in each of the two end cells. An electrical signal applied to one transducer element is converted to a mechanical motion which in turn is transmitted by the transmitting medium to the other transducer element, where it is converted back into an electrical signal, a desired time delay being introduced by the inherent properties of the transmitting medium.

The transducer element usually comprises a relatively thin disc or wafer of a suitable matering having piezoelectric properties, such for example as a quartz crystal. In prior-art devices of this general type, one of the problems is the extreme fragility of the transducer element. The specific gravity of mercury, the element usually employed as the transmitting medium, is so high that a relatively small mechanical shock will result in destruction of the transducer element unless proper mechanical support is provided for it.

It is a principal object of the present invention, therefore, to provide an improved end cell for an ultrasonic delay line in which the transducer element is supported in a manner which minimizes its tendency to break and, at the same time, provides an end cell of relatively good efficiency and of relatively low cost.

Another object is to provide a delay-line end cell which is simple and relatively easy to construct.

An additional object of the present invention is to provide, in an end cell, means for securing an extremely close contact with the back of the transducer element, without adversely affecting its efficiency as a transducer.

In accordance with the present invention there is provided, for use in an ultrasonic delay line, an end cell comprising the combination of a housing having a cavity and an opening connecting with the cavity, a transducer element substantially closing the opening, and a filling in the cavity comprising a mercury-silver amalgam.

In accordance with another important feature of the present invention, the back of the transducer element may be provided with a metallic backing, such for example as a silver coating, which tends to become part of the amalgam filling after the latter has been packed in place.

Other objects of the invention will be pointed out in the following description and claims and illustrated in the accompanying drawing, which disclose, by way of example, the principle of the invention and the best mode, which has been contemplated, of applying that principle.

In the drawing, in which like reference numerals refer to like components:

Figure 1:
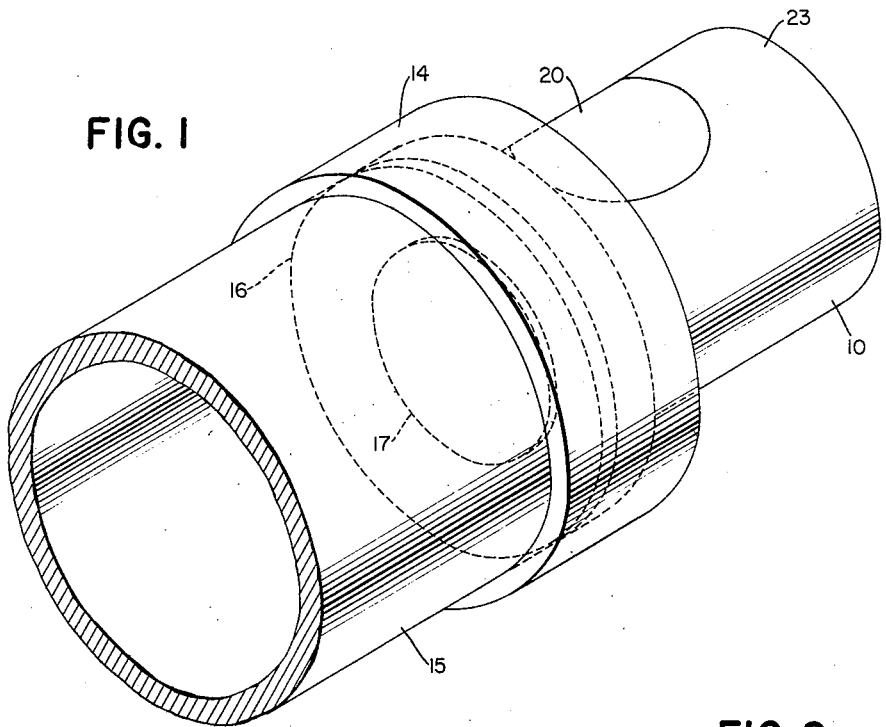
Fig. 1 is a perspective view of an end cell for an ultrasonic line in accordance with the present invention.
Figure 3:
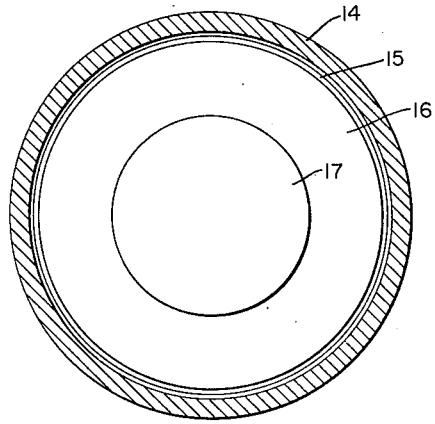
Fig. 3 is a section taken on the line 3—3 of Fig. 2.

Referring to the drawing, the end cell comprises a housing 10 of any suitable insulating material, as for example a phenolic resin. This housing is provided with an opening 11 at one end thereof, giving access to a cavity 12. The end of housing 10 containing opening 11 is provided with a flange 13 which in turn engages a ring collar member 14 adapted to threadably engage a metallic tube 15. Clamped between flange portion 13 of housing 10 and the end wall of tube member 15 is a transducer element 16 comprising a material having piezoelectric properties, as for example a quartz crystal. Secured to the surface of transducer element 16 facing cavity 12 in housing 10 is a metallic backing 17, as for example a silver coating evaporated upon or otherwise suitably applied to the surface of transducer element 16.

Housing 10 is provided with a top opening 18 and, at its end opposite opening 11, with a screw terminal 19. Cavity 12 is packed with a mercury-silver amalgam filling 20, this amalgam being introduced through opening 18 and making intimate contact with metallic backing 17 on transducer element 16. Metallic backing 17 tends to become a part of the amalgam filling after the packing operation has taken place. Tube 15 is filled with a suitable liquid transmitting medium 21, such as mercury.

For the purpose of introducing an electrical signal to transducer element 16, connections are preferably made to screw terminal 19, which makes contact with amalgam 20 in cavity 12, and with metallic tube 15 as illustrated diagrammatically by lead 22. Application of an electrical signal between screw terminal 19 and lead 22 causes transducer element 16 to change in dimensions in accordance with changes in the electrical potential, thus propagating an ultrasonic wave in transmitting medium 21. Amalgam filling 20 in cavity 12 provides a relatively good impedance match for the rear surface of transducer element 16, so that substantially all of the mechanical vibration developed by this element serves to agitate transmitting medium 21. Furthermore, the fact that the amalgam filling is in extremely close mechanical contact with the rear surface of transducer element 16 ensures adequate mechanical support for this element, thus minimizing its tendency to be broken by mechanical shock.

Figure 2:
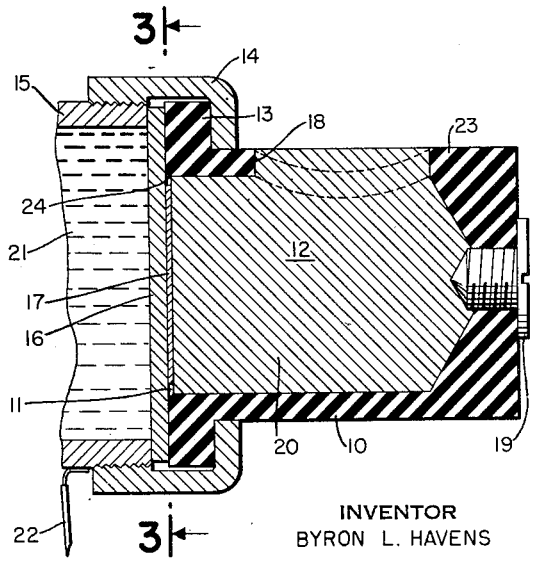
Fig. 2 is a vertical longitudinal section of the device of Fig. 1.

The rear portion 23 of cavity 12 is preferably conically shaped, as illustrated in Fig. 2, for the purpose of minimizing the effect of reflections which may occur from this surface. Such a configuration of this surface is readily achieved by employing an ordinary twist drill to form, in housing 10, opening 11 and cavity 12. If desired, however, housing 10 may be substantially cylindrical in configuration, upper opening 18 being dispensed with and filling 20 being introduced into cavity 12 through the open end of the housing.

Transducer element 16 is preferably cemented to flange portion 13 of housing 10 with a suitable material, such as shellac, and the edges of opening 11 are preferably chamfered as indicated at 24 to accommodate any excess cement and prevent it from adhering to the coated surface of transducer element 16.

It has been found that a mercury-silver amalgam especially adapted for use in the improved end cell of the present invention may comprise an amalgam made up of approximately 50% dental mercury and 50% of dental amalgam alloy. The properties of such a dental amalgam alloy are defined in Federal Specification U–A–451a, dated April 23, 1937, and published by the National Bureau of Standards. This specification defines a standard dental amalgam alloy as one containing not less than 65% of silver, not less than 25% of tin, not more than 6% of copper, and not more than 2% of zinc. In addition to amalgams of the type just described, satisfactory results have been secured in an arrangement according to the present invention by employing an amalgam in which the alloy used included a percentage of silver varying between 55 and 67, a percentage of tin varying between 38 and 27, a percentage of copper varying between 6 and 5, and a percentage of zinc varying between 2 and 1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the in-

What is claimed is:
1. In an ultrasonic delay line, an end cell comprising the combination of: a housing having a cavity and an opening connecting with said cavity, a transducer element substantially closing said opening, and a filling for said cavity comprising an amalgam of mercury and an alloy of silver, tin, copper and zinc.

2. In an ultrasonic delay line, an end cell comprising the combination of: a housing having a cavity and an opening connecting with said cavity, a transducer element substantially closing said opening, and a filling for said cavity comprising an amalgam of mercury and an alloy of between 55 and 67% of silver, between 38 and 27% of tin, between 6 and 5% of copper, and between 2 and 1% of zinc.

3. In an ultrasonic delay line, an end cell comprising the combination of: a housing having a cavity and an opening connecting with said cavity, a transducer element substantially closing said opening, and a filling for said cavity comprising an amalgam of mercury and an alloy of not less than 65% of silver, not less than 25% of tin, not more than 6% of copper, and not more than 2% of zinc.

4. In an ultrasonic delay line, an end cell comprising the combination of: a housing having a cavity and an opening connecting with said cavity, a transducer element substantially closing said opening, a metallic backing for said element, and a filling for said cavity comprising an amalgam of mercury and an alloy of silver, tin, copper and zinc.

5. In an ultrasonic delay line, an end cell comprising the combination of: a housing having a cavity and an opening connecting with said cavity; a transducer element substantially closing said opening, said element comprising a piezoelectric crystal; and a filling for said cavity comprising an amalgam of mercury and an alloy of silver, tin, copper and zinc.

6. In an ultrasonic delay line, an end cell comprising the combination of: a housing having a cavity and an opening connecting with said cavity; a transducer element substantially closing said opening, said element comprising a piezoelectric crystal; a metallic backing for said element; and a filling or said cavity comprising an amalgam of mercury and an alloy of silver, tin, copper and zinc.

7. In an ultrasonic delay line, an end cell comprising the combination of: a housing having a cavity and an opening connecting with said cavity; a transducer element substantially closing said opening, said element comprising a quartz crystal; and a filling for said cavity comprising an amalgam of mercury and an alloy of silver, tin, copper and zinc.

8. In an ultrasonic delay line, an end cell comprising the combination of: a housing having a cavity and an opening connecting with said cavity; a transducer element substantially closing said opening, said element comprising a quartz crystal; a metallic backing for said element; and a filling for said cavity comprising an amalgam of mercury and an alloy of silver, tin, copper and zinc.

References Cited in the file of this patent

UNITED STATES PATENTS

| Number | Name | Date |
|---|---|---|
| 1,692,074 | Burtis | Nov. 20, 1928 |
| 1,919,480 | Rieber | July 25, 1933 |
| 1,921,432 | Stallard | Aug. 8, 1933 |
| 2,077,204 | Bechmann | Apr. 13, 1937 |
| 2,423,306 | Forbes et al. | July 1, 1947 |
| 2,512,156 | Hoffman | June 20, 1950 |
| 2,624,852 | Forbes et al. | Jan. 6, 1953 |
| 2,629,827 | Eckert et al. | Feb. 24, 1953 |